(12) United States Patent
Kuwayama

(10) Patent No.: US 7,778,121 B2
(45) Date of Patent: Aug. 17, 2010

(54) OPTICAL DISC APPARATUS CAPABLE OF PRECISELY READING ADDRESS INFORMATION AND METHOD OF CONTROLLING OPTICAL DISC APPARATUS

(75) Inventor: Yasunori Kuwayama, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 471 days.

(21) Appl. No.: 11/939,577

(22) Filed: Nov. 14, 2007

(65) Prior Publication Data

US 2008/0112281 A1    May 15, 2008

(30) Foreign Application Priority Data

Nov. 15, 2006    (JP)    ............... 2006-308936

(51) Int. Cl.
*G11B 7/00*    (2006.01)

(52) U.S. Cl. ................................... 369/44.29

(58) Field of Classification Search ........... None
See application file for complete search history.

(56) References Cited

U.S. PATENT DOCUMENTS

| 6,058,099 | A  | * | 5/2000 | Senshu ............... 369/275.3 |
| 6,240,055 | B1 | * | 5/2001 | Takamine et al. ...... 369/44.29 |
| 6,643,239 | B2 | * | 11/2003 | Nakajo .................. 369/53.26 |
| 7,352,666 | B2 | * | 4/2008 | Chen ..................... 369/44.35 |

| 2001/0010667 | A1 | * | 8/2001 | Nakajo .................... 369/44.13 |
| 2002/0018412 | A1 | * | 2/2002 | Miyashita et al. ......... 369/47.24 |
| 2003/0048706 | A1 | * | 3/2003 | Kobayashi ............... 369/44.26 |
| 2005/0018559 | A1 | * | 1/2005 | Chen ....................... 369/44.35 |
| 2005/0117471 | A1 | * | 6/2005 | Yamane ................... 369/44.29 |

FOREIGN PATENT DOCUMENTS

| JP | 2000-222747 | 8/2000 |
| JP | 2002-269773 | 9/2002 |
| JP | 2005-216461 | 8/2005 |

OTHER PUBLICATIONS

Patent Abstracts of Japan, Publication No. 2000-222747 dated Aug. 11, 2000, 1 page.
Patent Abstracts of Japan, Publication No. 2002-269773 dated Sep. 20, 2002, 1 page.
Patent Abstracts of Japan, Publication No. 2005-216461 dated Aug. 11, 2005, 1 page.

* cited by examiner

*Primary Examiner*—Peter Vincent Agustin
(74) *Attorney, Agent, or Firm*—Osha Liang LLP

(57) ABSTRACT

Detection of a wobble cycle of wobble formed at a groove of an optical disc is started. A phase locked loop time that is from reset of phase locked loop circuit until a signal read from the wobble locks is calculated. The focus balance value corresponding to the minimum phase locked loop lock time is set as the focus balance value for ADdress In Pre-groove. When ADdress In Pre-groove information being address information is read, focusing servo control is performed with the focus balance value for ADdress In Pre-groove.

6 Claims, 4 Drawing Sheets

OPTICAL DISC APPARATUS CAPABLE OF PRECISELY READING ADDRESS INFORMATION AND METHOD OF CONTROLLING OPTICAL DISC APPARATUS

BACKGROUND OF THE INVENTION

1. Field of the Invention

The present invention relates to servo control of an optical disc apparatus that records and plays back information on and from an optical disc by means of an optical pickup, and particularly, to focusing servo control.

2. Description of the Background Art

Conventionally, there has been an optical disc apparatus that records and/or plays back information, by means of an optical head referred to an optical pickup, on and/or from an optical disc having concentric or spiral information recording track(s) formed thereon, such as a CD or a DVD. The optical pickup is configured to condense and apply light of a semiconductor laser or the like on the optical disc by an objective lens, and to receive reflected light of the applied light from the optical disc to output a corresponding electric signal, and it moves in the radial direction of the optical disc.

The optical disc apparatus moves the optical pickup to a prescribed position on the optical disc. While rotating the optical disc, the optical disc apparatus condenses the light from the optical pickup and applies it to the recording track of the optical disc, thereby records and/or plays back information on and/or from the optical disc.

When information is played back from an optical disc, firstly, focus-on (focus lock-in) is attained by focusing servo control so that the focusing point of the light applied by the optical pickup is positioned on the surface of the optical disc. Then, track-on (track lock-in) is attained by tracking servo control so that the focused-on light is positioned on the recording track. Such focus-on and track-on are performed by moving the objective lens in the direction perpendicular to the optical disc surface and in the direction perpendicular to the recording track. In the state where focus-on and track-on are attained, based on an electric signal output from the optical pickup, pits formed on the optical disc are detected, whereby information is read from the optical disc, and the information is played back. The recording of information on the optical disc is performed by forming pits in the recording track of the optical disc by the light condensed and applied to the optical disc from the optical pickup.

In playing back and recording information from and on an optical disc, the above-described focusing servo control and tracking servo control are performed by obtaining a focus error signal and a track error signal by calculation based on reflected light of the laser light, and by adjusting so that the errors are reduced. The adjusting operation greatly changes the record signal quality (such as jitter), and therefore precise adjustment is required. Japanese Patent Laying-Open Nos. 2000-222747, 2002-269773, and 2005-216461 disclose related techniques.

On the other hand, a DVD+R or a DVD+RW as one type of optical discs employs the wobble groove scheme as the physical format. Specifically, a spiral groove is provided, along which data is written. The groove is wobbled such that it slightly meanders cyclically in the radial direction. In the wobble, address information that is ADdress In Pre-groove information indicative of the physical address is embedded.

When information has been recorded on the optical disc and thereafter the ADdress In Pre-groove information embedded in the wobble is read, conventionally the ADdress In Pre-groove information is read using a focus balance value set by a focus control unit as it is, as in the case of reading normal recording pits.

However, after the information has been recorded on the optical disc, reading the address information embedded in the wobble may be difficult due to the effect of superimposition components of the recorded RF (Radio Frequency) signal.

FIG. 5 is a graph for describing the relationship between the jitter value of an RF signal (also referred to as an RF jitter value) generated by reading pits recorded on an optical disc or an ADdress In Pre-groove error rate and a focus balance value.

Referring to FIG. 5, the left ordinate axis indicates RF jitter value. In connection with the focus balance value, focus balance value Fb with which the RF jitter value is minimized is shown. The right ordinate axis indicates ADdress In Pre-groove error rate, that is the error rate in reading ADdress In Pre-groove information. In connection with the focus balance value, focus balance value Fb# with which the error rate is minimized is shown.

As shown, the optimum focus balance value with which the RF jitter value is minimized and that with which the ADdress In Pre-groove error rate is minimized are different. It has conventionally been considered that there are no difference in characteristics between reading ADdress In Pre-groove information and normally reading pits, and therefore the same focus balance value has been employed. However, as described above, it has been found that the characteristics may be different after information has been recorded on an optical disc.

SUMMARY OF THE INVENTION

The present invention has been made to solve the above-described problem, and an object thereof is to provide an optical disc apparatus that can perform precise reading when reading address information.

An optical disc apparatus recording and playing back information by applying laser light to an optical disc according to the present invention includes: an optical pickup applying the laser light to the optical disc and receiving reflected light of the applied laser light; a servo control unit performing focusing servo control over the laser light applied to the optical disc; and a control unit obtaining information recorded on the optical disc and controlling the servo control unit based on the reflected light from the optical pickup. The control unit sets, based on the reflected light from the optical pickup, a focus balance value for use by the servo control unit in obtaining address information of a physical address provided in advance to the optical disc to a focus balance value that is different from a focus balance value in receiving reflected light from a recording pit of the optical disc.

Preferably, the control unit obtains address information based on reflected light from a phase modulation area of wobble formed at a groove of the optical disc.

Preferably, the control unit obtains the address information based on reflected light from wobble formed at a groove of the optical disc, and on reflected light from a land prepit formed at a land of the optical disc.

Preferably, the control unit measures time by which a cycle of wobble formed at a groove of the optical disc varying according to a focus balance value synchronizes with a target frequency, and in obtaining the address information of the physical address provided in advance to the optical disc, the control unit sets the focus balance value to a focus balance value attaining a minimum measurement time.

Preferably, the control unit switches the focus balance value between when obtaining the address information of the physical address provided in advance to the optical disc and when receiving the reflected light from the recording pit.

A method of controlling an optical disc apparatus recording and playing back information by applying laser light to an optical disc according to the present invention includes the steps of: applying the laser light to the optical disc and receiving reflected light of the applied laser light; and performing focusing servo control over the laser light applied to the optical disc. In the step of performing the focusing servo control, a focus balance value in obtaining address information of a physical address provided in advance to the optical disc is set, based on the reflected light, to a focus balance value that is different from a focus balance value in receiving reflected light from a recording pit of the optical disc.

With the optical disc apparatus and a method of controlling the same according to the present invention achieve precise reading when reading address information after information has been recorded on an optical disc, by setting a focus balance value in obtaining address information of a physical address provided in advance to the optical disc to a focus balance value that is different from a focus balance value in receiving reflected light from a recording pit of the optical disc.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
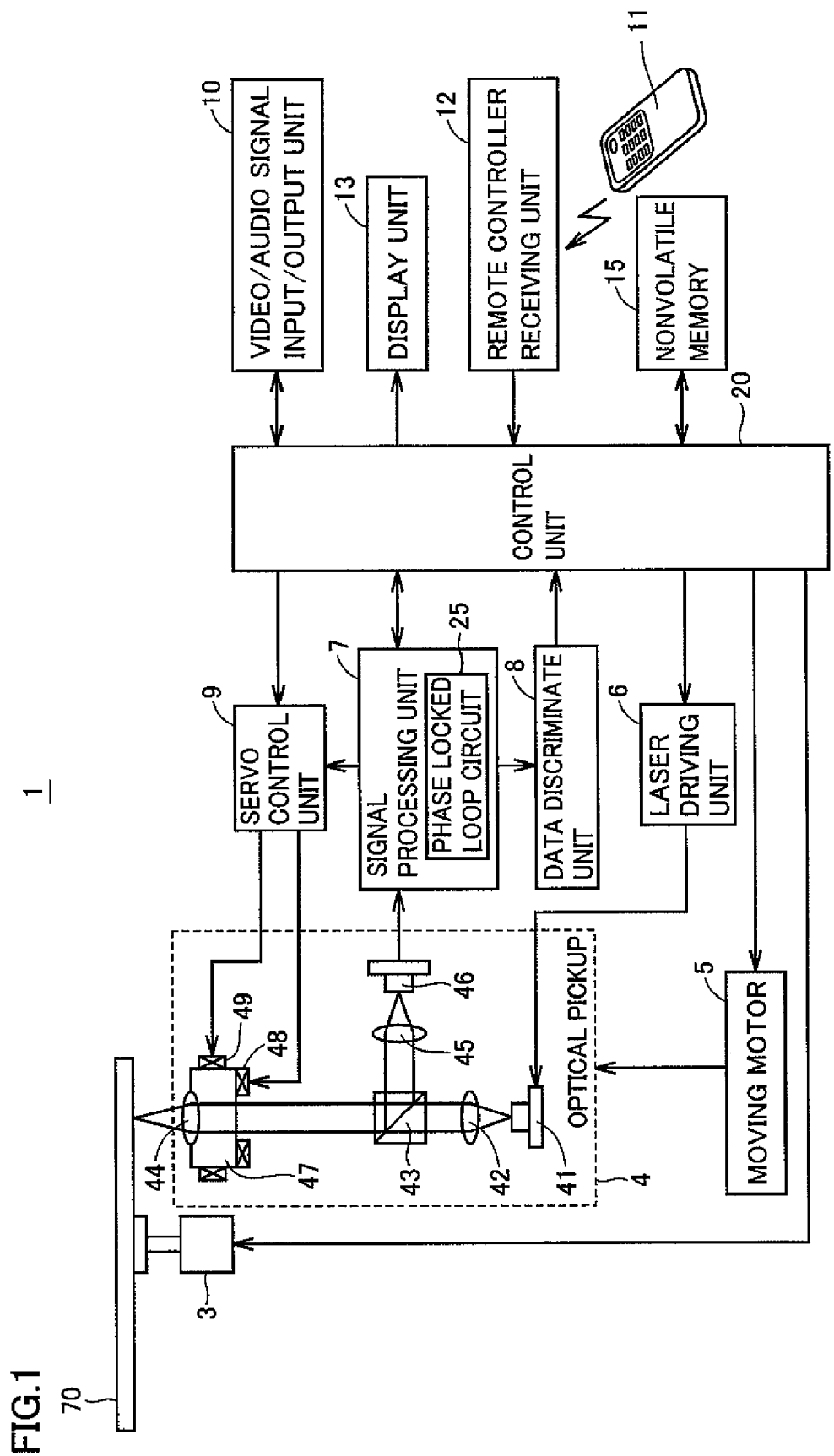
FIG. 1 is a schematic block diagram of an optical disc apparatus according to an embodiment of the present invention.

In the following, referring to the drawings, an embodiment of the present invention is described in detail. Throughout the drawings, identical or corresponding parts are denoted by the identical reference characters, and description thereof will not be repeated.

Referring to FIG. 1, an optical disc apparatus 1 according to the embodiment of the present invention records and/or plays back information such as music or video on and/or from an optical disc 70 such as a CD or a DVD having concentric or spiral information recording track(s) formed thereon. It is noted that the optical disc apparatus according to the present embodiment is the one capable of recording/playing back a CD or DVD compatible. Here, a DVD+R or a DVD+RW is described as one optical disc.

Optical disc apparatus 1 includes a spindle motor 3, an optical pickup 4, a moving motor 5, a laser driving unit 6, a signal processing unit 7, a data discriminate unit 8, and a servo control unit (a focusing control unit and a tracking control unit) 9. Further, optical disc apparatus 1 includes a video/audio signal input/output unit 10, a remote controller 11, a remote controller receiving unit 12, a display unit 13, a nonvolatile memory 15, and a control unit 20 for controlling each of the units.

An optical disc is inserted from a not-shown disc inserting portion and placement thereof onto a disc tray is detected. A signal indicative of the same is input to control unit 20. The inserted optical disc 70 is attached to spindle motor 3. Spindle motor 3 is rotated in accordance with an instruction from control unit 20, and controlled such that the attached optical disc 70 rotates at a prescribed speed.

Optical pickup 4 applies light to optical disc 70 for recording and/or playing back information. Optical pickup 4 receives the reflected light from optical disc 70 and converts it into an electric signal and outputs the same. Optical pickup 4 is moved in the radial direction on optical disc 70 by moving motor 5 made of a linear motor, based on an instruction from control unit 20.

Optical pickup 4 condenses and applies the light received from semiconductor laser 41 to optical disc 70 via a collimate lens 42, a beam splitter 43, and an objective lens 44. The light reflected from optical disc 70 is received at a photodetector 46, via objective lens 44, beam splitter 43, and a condense lens 45.

Semiconductor laser 41 has its light emission controlled by laser driving unit 6 operating in response to an instruction from control unit 20. Photodetector 46 is constituted of a split photodiode having its light receiving surface divided into a plurality of areas each outputting an electric signal corresponding to the reflected light intensity from optical disc 70. The signal from photodetector 46 is input to signal processing unit 7.

Objective lens 44 is held by a lens holder 47, which is provided with a focusing coil 48 and a tracking coil 49. Focusing coil 48 moves objective lens 44 in a direction perpendicular to the disc surface of optical disc 70 by the magnetic effect of a not-shown magnet. Similarly, tracking coil 49 moves objective lens 44 in parallel with the disc surface of optical disc 70 and in a direction perpendicular to the recording track of optical disc 70.

Signal processing unit 7 generates an RF signal based on the signal received from photodetector 46, and outputs it to data discriminate unit 8. Data discriminate unit 8 generates a data slice signal by binarizing the RF signal, and provides it to control unit 20. Control unit 20 detects a pit formed on optical disc 70 based on the data slice signal.

Signal processing unit 7 generates a focus error signal and a track error signal based on the signal received from photodetector 46, and outputs them to servo control unit 9. The focus error signal is a signal corresponding to a shift amount, from the optical disc surface, of a focusing point of the light applied to optical disc 70 via objective lens 44. The track error signal corresponds to a shift amount of the focusing point from the recording track. Signal processing unit 7 includes a phase locked loop circuit 25. Photodetector 46 provides the phase locked loop circuit 25 with a signal from the wobble provided on the optical disc surface, and the phase locked loop circuit 25 provides control unit 20 with a signal corresponding to the cycle of the wobble.

Control unit 10 performs generation of clock in a recording mode and the like based on the received signal that corresponds to the wobble cycle, and obtains ADdress In Pre-groove information that is address information of the physical address of the optical disc based on the signal from the phase modulation area of the wobble.

By the instruction from control unit 20 and based on the focus error signal and the track error signal, servo control unit 9 controls current supply to focusing coil 48 and tracking coil 49 to move objective lens 44, thereby performs servo control such that the light focusing point is positioned on the disc surface and on the recording track of optical disc 70. In response to an instruction from control unit 20, servo control unit 9 performs servo control that is different from the servo control in a normal pit reading mode.

To video/audio signal input/output unit 10, a not-shown external apparatus such as a display, a speaker and a television receiver is connected, so that video signal and/or audio signal played back from optical disc 70 is output, and video signal and/or audio signal from the external apparatuses is input.

Remote controller 11 is for manipulating various operations of optical disc 1, and provided with manipulation keys (all not shown) for manipulating the operations. In response to the manipulation of the keys, remote controller 11 outputs a corresponding signal of infrared signal. Remote controller receiving unit 12 receives the infrared signal from remote controller 11, and outputs the signal to control unit 20. Display unit 13 is provided on a front panel of the body of optical disc apparatus 1, and displays the content of the manipulation by remote controller 11 or the operation state of optical disc apparatus 1.

Here, information recording on and playback from optical disc 70 is described. First, as to information playback from optical disc 70, while optical disc 70 is rotated by spindle motor 3 at a prescribed speed, the light from semiconductor laser 41 is applied to optical disc 70, and the reflected light is received by photodetector 46. Servo control unit 9 controls current supply to focusing coil 48 based on a focus error signal from signal processing unit 7 to move objective lens 44, and achieves focus-on (focus lock-in) so that the focusing point of light from semiconductor laser 41 is positioned on the surface of optical disc 70. Further, servo control unit 9 controls current supply to tracking coil 49 based on a track error signal from signal processing unit 7 to move objective lens 44, and achieves track-on (track lock-in) so that the focusing point of light from semiconductor laser 41 is positioned on a desired recording track.

After focus-on and track-on are achieved, servo control unit 9 performs focusing servo control and tracking servo control by controlling current supply to focusing coil 48 and tracking coil 49 based on the focus error signal and the track error signal so that the focus-on state and the track-on state are maintained.

In this servo state, signal processing unit 7 provides an RF signal to data discriminate unit 8, which binarizes the RF signal to be a data slice signal and provides the same to control unit 20. Control unit 20 detects presence/absence of pits formed on optical disc 70 based on the data slice signal, and reads information recorded on optical disc 70, and plays back a video signal and/or an audio signal from the read information, and outputs the same to an external apparatus from video/audio signal input/output unit 10.

Similarly, recording information on optical disc 70 is performed by forming pits on optical disc 70 by light from semiconductor laser 41 while the focusing and tracking servo states are attained. Here, the video signal and/or audio signal input from video/audio signal input/output unit 10 is coded by control unit 20. Semiconductor laser 41 has its light emission controlled according to the coded data, under control of control unit 20. Thus, pits corresponding to the coded data are formed in the recording track of optical disc 70, and video information and/or audio information are recorded. Pits can be formed by higher light emission output of semiconductor laser light 41 than in reading information.

On the other hand, as described above, after information has been recorded on the optical disc, reading the address information embedded in the wobble may be difficult due to the effect of pits.

In the present embodiment, when ADdress In Pre-groove information being address information embedded in the wobble of an optical disc is to be read, reading is performed while a focus-on state being different from that in normal pit reading is set.

In the following, a scheme of setting a focus balance value for use in focus-on for ADdress In Pre-groove according to the embodiment of the present invention is described. Here, a scheme of setting the focus balance value by control unit 20 is exemplarily described.

Figure 2:
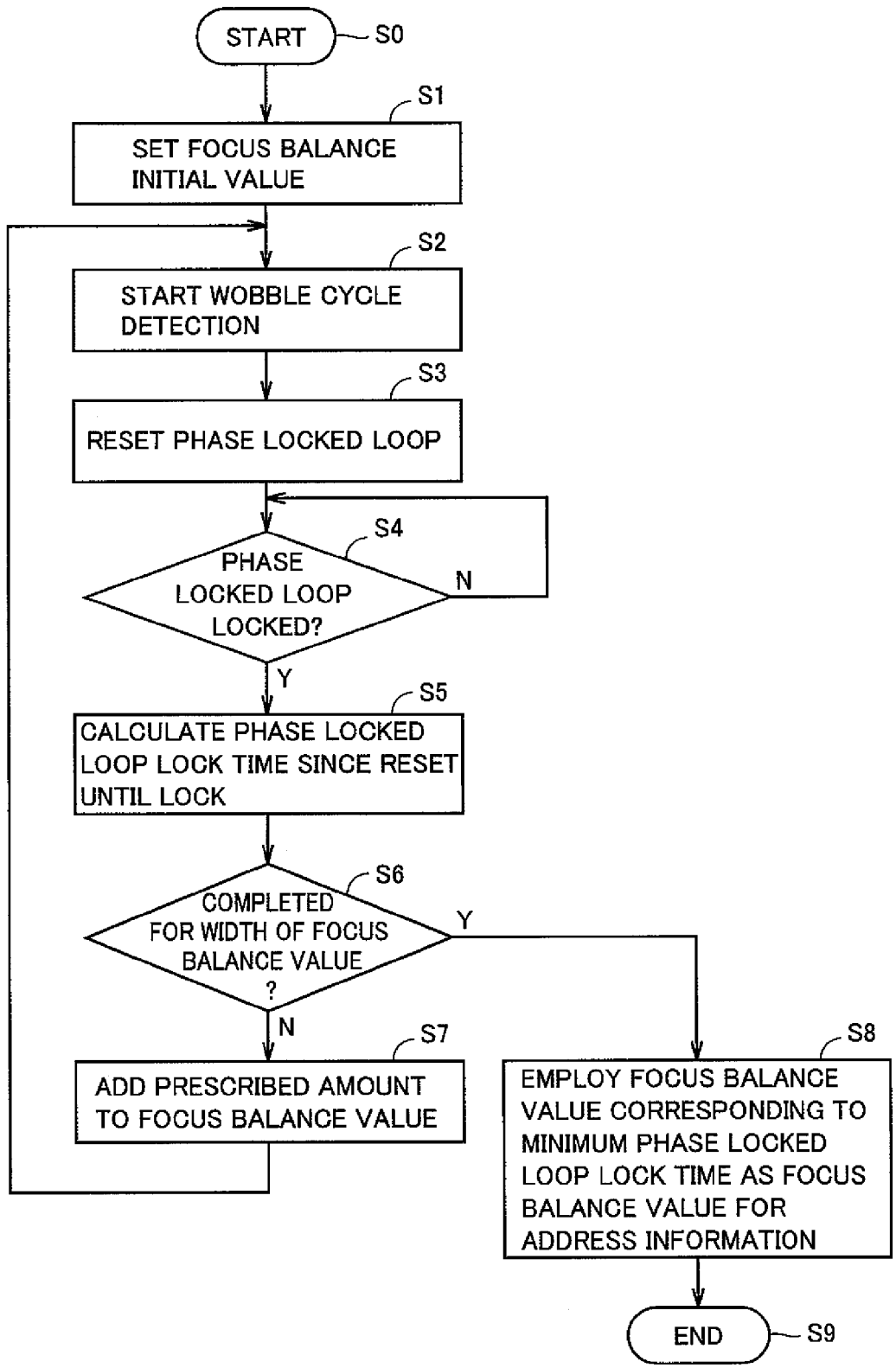
FIG. 2 is a flowchart describing setting of a focus balance value for ADdress In Pre-groove according to the embodiment of the present invention.

Referring to FIG. 2, setting of the focus balance value for ADdress In Pre-groove according to the present embodiment is described.

First, when ADdress In Pre-groove information is to be read, a mode for setting the focus balance value for ADdress In Pre-groove is entered (start) (step S0).

Then, an initial value of the focus balance value is set (step S1). Specifically, as the initial value of the focus balance value, a parameter stored in advance on nonvolatile memory 15 in FIG. 1 is read and used. Other necessary parameters are also similarly read from nonvolatile memory 15. Control unit 20 instructs servo control unit 9 to set the read focus balance value. Thus, servo control unit 9 is set to a focus-on state according to the instructed focus balance value.

Then, detection of a wobble cycle is started (step S2). For example, reading is performed for one track from an arbitrary track, to thereby detect the wobble cycle. Specifically, a signal read from the wobble is provided to control unit 20 via the phase locked loop circuit 25 of signal processing unit 7. Control unit 20 detects the wobble cycle based on the output waveform of the phase locked loop circuit 25.

Next, control unit 20 resets the phase locked loop circuit 25, i.e., sets it to an initial state (step S3).

Control unit 20 determines whether or not a signal read from the wobble and provided to the phase locked loop circuit 25 after being reset synchronizes (locks) with a target frequency (step S4). When it is determined that the signal synchronizes, the control goes to next step S5.

In step S5, control unit 20 calculates a phase locked loop lock time, which is from the reset of phase locked loop circuit 25 until the signal read from the wobble locks (step S5).

Control unit 20 determines whether or not measurement for a width of a focus balance value has been completed (completed for focus balance value width) (step S6). That is, it determines whether or not calculation of a phase locked loop lock time for a predetermined prescribed range of a focus balance value is performed.

In step S6, when the measurement for the width of the focus balance value has not been completed, the control goes to step S7, where a prescribed amount is added to the focus balance value. Then the control goes back to step S2, and the phase locked loop lock time calculation described above is again performed with the focus balance value to which the prescribed amount is added. It is noted that the addition of a prescribed amount to the focus balance value means that a focus error signal is biased to adjust the bias rate. Thus, the bias rate is positively or negatively adjusted relative to a focus balance initial value. The adjustment of the bias rate is of a general nature, and data or the like stored in advance on nonvolatile memory 15 or the like can be used.

In step S6, when measurement for the width of the focus balance value has been completed, the control goes to step S9, where the focus balance value corresponding to the minimum phase locked loop lock time is set as the focus balance value for address information (ADIP). Then the process ends (step S9). Though it has been described in the foregoing that the wobble cycle is detected by reading for one track once, it is also possible to read for one track for a plurality of times and calculate the average of the plurality of phase locked loop lock times as the phase locked loop lock time. When reading is performed for a plurality of times, a precise phase locked loop lock time can be calculated.

Figure 3:
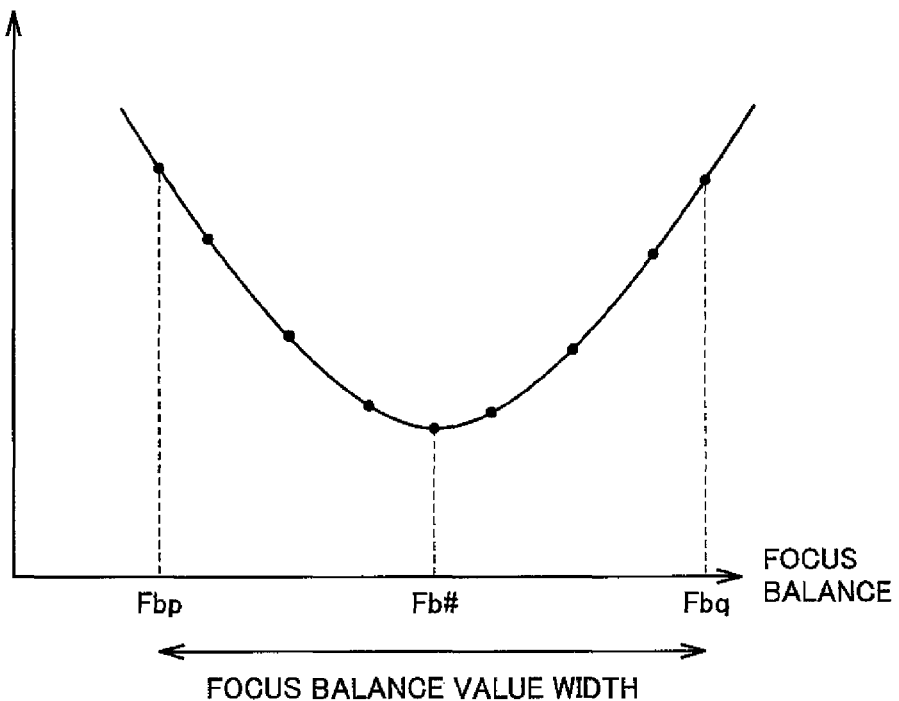
FIG. 3 is a graph for describing a phase locked loop lock time that changes according to the width of the focus balance value.

Referring to FIG. 3, the phase locked loop lock time that varies in accordance with the width of the focus balance value is described.

Referring to FIG. 3, herein the phase locked loop lock time is calculated for focus balance values from Fbp to Fbq as the width of a focus balance value. Specifically, it shows the phase locked loop lock time with the initial value of focus balance Fbp and the phase locked loop lock times with the focus balance values increased by a prescribed amount. Focus balance value Fb# is shown as corresponding to the minimum phase locked loop lock time.

As described referring to the flowchart of FIG. 2, in step S8, focus balance value Fb# corresponding to the minimum phase locked loop lock time can be set as the focus balance value for ADdress In Pre-groove.

In accordance with the process of the flowchart, by detecting the optimum focus balance value and setting the same, precise ADdress In Pre-groove information can be obtained.

When the focus balance value for ADdress In Pre-groove is once set, for example it may be stored on nonvolatile memory 15. Thus, from the next and following reading of ADdress In Pre-groove information, the focus balance value for ADdress In Pre-groove is not set according to the flowchart of FIG. 2. Instead, the focus balance value stored in nonvolatile memory 15 is specified to servo control unit 9, whereby a focus-on state being different than in normal pit reading can be set and reading can be performed.

Figure 5:
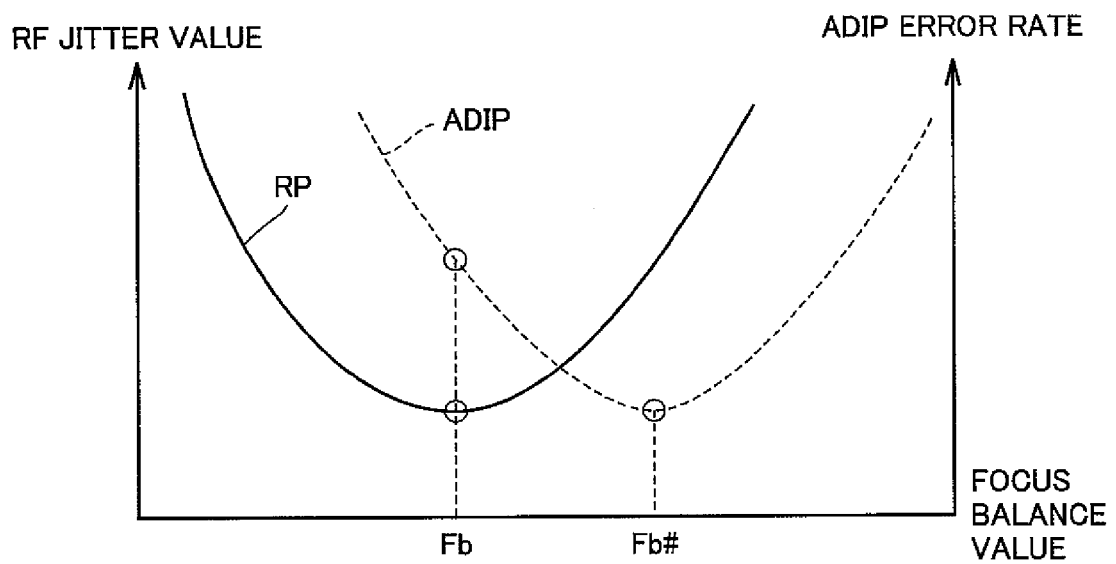
FIG. 5 is a graph for describing the relationship between a jitter value of an RF signal generated by reading pits recorded on an optical disc or ADdress In Pre-groove error rate and the focus balance value.

There are various schemes for detecting the optimum focus balance value. It is also possible to detect the optimum focus balance value from the relationship between the error rate of ADdress In Pre-groove information and the focus balance value, as shown in FIG. 5. In the present embodiment, in place of the error rate of ADdress In Pre-groove information, the characteristics of the phase locked loop lock time and the focus balance value are employed in detecting the optimum focus balance value. Here, similarly to an inappropriate focus balance value providing a greater error rate, reading from wobble with an inappropriate focus balance value results in a longer phase locked loop lock time due to noise superimposed on the read signal. On the other hand, with an appropriate focus balance value, less noise is superimposed on a signal read from the wobble and therefore the phase locked loop lock time is short. That is, the focus balance value for ADdress In Pre-groove according to the present embodiment is detected and set, based on that the relationship between the phase locked loop lock time and the focus balance value can be considered to be the same as the relationship between the error rate of ADdress In Pre-groove information and the focus balance value.

It is also possible to detect the optimum focus balance value based on the time by which the ADdress In Pre-groove information is sensed.

Figure 4:
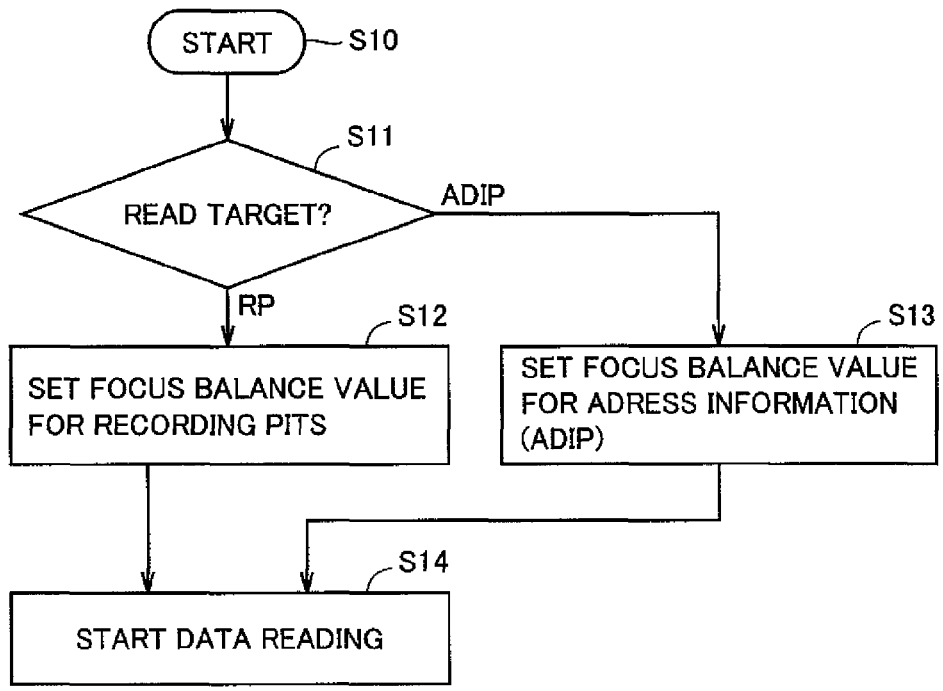
FIG. 4 is a flowchart describing a switching operation of the focus balance value in a control unit.

Referring to FIG. 4, an operation of switching focus balance values by control unit 20 is described.

Referring to FIG. 4, when reading from an optical disc (start) (step S10), control unit 20 determines information that is the target of reading from the optical disc (read target?) (step S11). When the target of reading from the optical disc is reading from recording pits (RP), a focus balance value to be used in normal pit reading, that is, a focus balance value for detecting an RF signal (a focus balance value for RP) is set (step S12), and recording pits of the optical disc is read (start data reading) (step S14).

On the other hand, in step S11, when address information is read, a focus balance value for ADdress In Pre-groove described above is set (step S13), and data reading is started (step S14).

That is, based on the information that is the target of reading from the optical disc, the focus balance value switching operation is performed. By the operation, the optimum focus balance value for the information being the target of reading can be set, and therefore precise recording information or ADdress In Pre-groove information can be obtained. There are various schemes of setting a focus balance value for RP. Such schemes are common techniques for a person skilled in the art, and therefore they are not described herein.

In the foregoing, obtaining ADdress In Pre-groove information from a DVD+R or a DVD+RW as one optical disc has mainly been described. As to a DVD-R or a DVD-RW, address information is obtained based on reflected light from land prepits (LPP) formed at the land of the optical disc, in place of ADdress In Pre-groove information being the address information embedded in the wobble of the optical disc.

As to a DVD-R or a DVD-RW also, reading of address information of the land prepits may be difficult after information has been recorded on the optical disc, due to the effect of the superimposed components of the RF signal being recorded.

Accordingly, similarly to the reading of ADdress In Pre-groove information, by setting the focus balance value to be used in focus-on for land prepits, precise address information can be obtained with the optimum focus balance value.

As to the setting scheme of the focus balance value, the characteristics of the error rate of the address information of LPP and focus balance value can be employed, or the characteristics of the phase locked loop lock time and the focus balance value can be employed. It is also possible to detect the optimum focus balance value based on the time by which the address information of LPP is sensed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical disc apparatus recording and playing back information by applying laser light to an optical disc, comprising:

an optical pickup applying the laser light to said optical disc and receiving reflected light of the applied laser light;

a servo control unit performing focusing servo control over the laser light applied to said optical disc; and a control unit obtaining information recorded on said optical disc and controlling said servo control unit based on the reflected light from said optical pickup, wherein said control unit sets, based on the reflected light from said optical pickup, a focus balance value for use by said servo control unit in obtaining address information of a physical address provided in advance to said optical disc to a focus balance value that is different from a focus balance value in receiving reflected light from a recording pit of said optical disc.

2. The optical disc apparatus according to claim 1, wherein said control unit measures time by which a cycle of wobble formed at a groove of said optical disc varying according to a focus balance value synchronizes with a target frequency, and in obtaining the address information of the physical address provided in advance to said optical disc said control unit sets the focus balance value to a focus balance value attaining a minimum measurement time.

3. The optical disc apparatus according to claim 1, wherein said control unit obtains address information based on reflected light from a phase modulation area of wobble formed at a groove of said optical disc.

4. The optical disc apparatus according to claim 1, wherein said control unit obtains the address information based on reflected light from wobble formed at a groove of said optical disc, and on reflected light from a land prepit formed at a land of said optical disc.

5. The optical disc apparatus according to claim 1, wherein said control unit switches the focus balance value between when obtaining the address information of the physical address provided in advance to said optical disc and when receiving the reflected light from the recording pit.

6. A method of controlling an optical disc apparatus recording and playing back information by applying laser light to an optical disc, comprising the steps of:
applying the laser light to said optical disc and receiving reflected light of the applied laser light; and
performing focusing servo control over the laser light applied to said optical disc, wherein
in said step of performing the focusing servo control, a focus balance value in obtaining address information of a physical address provided in advance to said optical disc is set, based on the reflected light, to a focus balance value that is different from a focus balance value in receiving reflected light from a recording pit of said optical disc.

* * * * *